United States Patent [19]

MacGregor

[11] 4,350,042
[45] Sep. 21, 1982

[54] TIME-DEPTH INTEGRATOR

[76] Inventor: Douglas MacGregor, 972 E. 5650 South, Salt Lake City, Utah 84121

[21] Appl. No.: 223,990

[22] Filed: Jan. 12, 1981

[51] Int. Cl.³ .............................................. G01F 23/14
[52] U.S. Cl. ..................................... 73/432 R; 73/300
[58] Field of Search ...................... 73/300, 299, 432 R

[56] References Cited

U.S. PATENT DOCUMENTS

| | | | |
|---|---|---|---|
| 3,777,573 | 12/1973 | Alinari | 73/432 R |
| 4,056,010 | 11/1977 | Alinari | 73/432 R |
| 4,098,110 | 7/1978 | Bowden | 73/300 |

*Primary Examiner*—Donald O. Woodiel
*Attorney, Agent, or Firm*—Robert R. Mallinckrodt

[57] ABSTRACT

A time-depth integrator for divers to indicate when a diver is approaching or has reached the maximum safe time limit for a dive without requiring decompression procedures when surfacing includes an evacuated chamber with an elongate channel communicating therewith. The channel has a breakable seal and contains an orifice so that when the seal is broken under water, water flows through the orifice into and along the channel to the evacuated chamber. Indications along the length of the channel show how far water has progressed in the channel and indicate the maximum safe limit and approach thereto.

8 Claims, 13 Drawing Figures

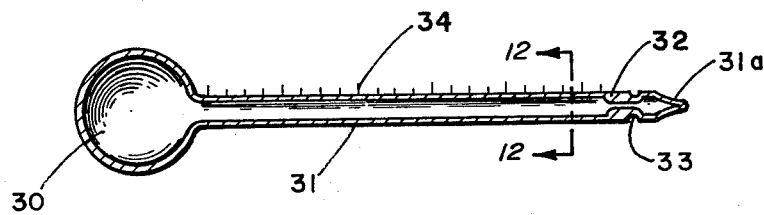
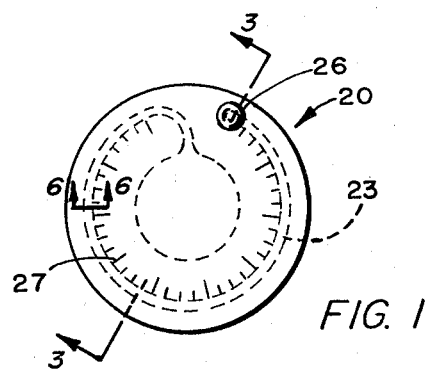
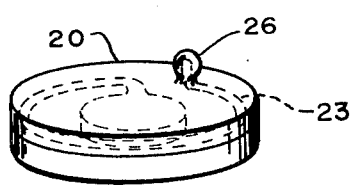
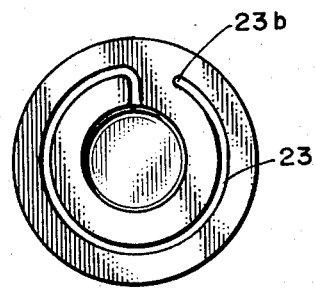
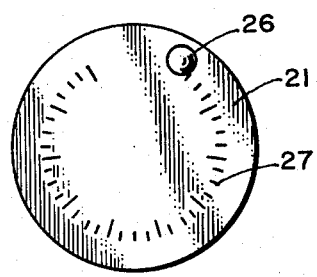
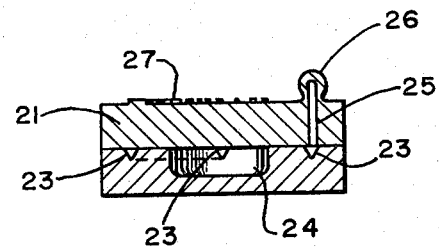

TIME-DEPTH INTEGRATOR

BACKGROUND OF THE INVENTION

1. Field:

The invention is in the field of methods and apparatus for measuring the extent of gas accumulation in the body of a scuba diver.

2. State of the Art:

A column of fresh water 33 feet high or sea water 32 feet high exerts one atmosphere of pressure. Since the water surface is already at one atmosphere pressure, the pressure at a depth of 33 feet in fresh water is 2 atmospheres. The pressure increases by 1 atmosphere for every 33 feet further that one descends. Thus, at a depth of 100 feet, the pressure exerted on a diver will be 4 atmospheres.

Air is made up primarily of oxygen (about 20%) and nitrogen (about 80%). At sea level, approximately one liter of nitrogen is dissolved in an average person's body. Nitrogen is about five times as soluble in fat as in water so that more than half of the nitrogen is dissolved in body fats, even though the fats only make up about 15% of the body. Nitrogen is not metabolized by the body, so it remains dissolved in the body to an extent dependent on the pressure. Oxygen is metabolized and thus is not a problem when a diver breathes compressed air.

As a diver descends, the pressure on his body increases and the pressure of the compressed air which he breathes must also increase in order for him to breathe properly. As the pressure increases, the amount of nitrogen dissolved in a diver's body also increases. Thus, at 33 feet a diver will have two liters of nitrogen dissolved in his body; at 100 feet his body will hold four liters. However, the nitrogen is not dissolved instantly. Rather, several hours are required before the body becomes saturated with nitrogen as all of the tissues in the body come into equilibrium with the gas pressure in the diver's lungs. Furthermore, the nitrogen dissolves at different rates in different parts of the diver's body. The water in the diver's body is saturated in about one hour, whereas the fat, which requires much more nitrogen before it is saturated, and also has a poor blood supply to carry the nitrogen, reaches saturation only after several hours.

Thus, the deeper a diver descends and the longer he remains submerged, the more nitrogen will dissolve in his body. As a diver ascends, the pressure on his body will decrease and the nitrogen will be liberated from his tissues. If the ascent is too rapid, actual bubbles of nitrogen will form. Bubbles forming in the brain, spinal cord, or peripheral nerves can cause paralysis or convulsions, or other effects. Bubbles in the joints or muscles cause severe pain. Nitrogen bubbles in the respiratory system can cause difficulty in breathing and heavy coughing. In any event, the experience is painful and may result in permanent injury. To avoid these effects a diver must ascend slowly enough to allow the excess nitrogen to be expelled slowly from his body without bubble formation, or he must ascend before too much nitrogen has dissolved in his body. The United States Navy has established maximum safe limits for diving at various depths without requiring decompression procedures. For instance, it has been determined that a diver can ascend immediately to the surface without danger of nitrogen bubble formation in his body if he remains no longer than 100 minutes at a depth of 50 feet, or 25 minutes at 100 feet, or 5 minutes at 150 feet.

Since the amount of nitrogen dissolved in the body is a function of depth and time, it would be advantageous to have an instrument which could take into account the depths to which a diver dives and the length of time he spends at these various depths, and gives a readout or indication of when the diver must ascend to avoid going through decompression procedures. Such instruments, called time-depth integrators, are available commercially, but the present instruments are mechanical devices subject to shock and wear, and are expensive.

SUMMARY OF THE INVENTION

According to the present invention, the point where a diver must either ascend or require decompression procedures is easily, accurately, and inexpensively measured by use of a device comprising an evacuated chamber, a narrow channel or tube communicating with the interior of the chamber at one end and sealed at the other end, and an orifice near the distal end of the channel or tube. The device is left sealed until a diver enters the water, at which time the seal is broken.

The amount of water passing through the orifice into the tube will be dependent upon the size of the orifice, the pressure of the water, and the length of time the device remains under water. Since the rate at which water will pass through a given orifice is dependent upon the water pressure, which in turn is dependent upon the diver's depth, this device will serve as a time-depth integrator. By choosing an appropriate sized orifice, the amount of water entering the device will indicate when a diver has been exposed to pressure conditions such that he must either ascend immediately, or require decompression procedures if he continues his dive. Graduations on the tube permit the diver to easily monitor his approach to the maximum safe limits for diving without requiring decompression procedures. Proper selection of a tube material makes the vacuum-water interface readily visible.

The device is a disposable unit used only for a single dive.

THE DRAWINGS

In the accompanying drawings, which represent various embodiments of the invention:

FIG. 1 is a top plan view of one embodiment of a device of the invention showing internal cavities by broken lines;

FIG. 2, a perspective view of the device of FIG. 1, but not showing the graduations;

FIG. 3, a vertical section taken along the line 3—3 of FIG. 1;

FIG. 4, a top plan view of the bottom piece shown in FIG. 3;

FIG. 5, a top plan view of the top piece shown in FIG. 3;

FIG. 6, a fragmentary vertical section taken along the line 6—6 of FIG. 1, partially broken away for convenience of illustration, showing light from above being reflected when the channel is void of water;

FIG. 7, a view similar to that of FIG. 6 showing the passage of light when the channel is filled with water;

FIG. 8, a longitudinal vertical section taken axially through a second embodiment of the device, graduation indications having been arbitrarily applied to the drawing;

FIG. 9, a top plan view of the device of FIG. 8 as it appears in use partially filled with water and submerged in water;

FIG. 10, a top plan view of the device of FIG. 8 in a holder;

FIG. 11, a fragmentary top plan view of a portion of the device of FIG. 10 drawn to a larger scale and showing the vacuum-water interface;

FIG. 12, a vertical section taken along the line 12—12 of FIG. 8 showing the addition of a coating to the bottom surface; and FIG. 13, a fragmentary top plan view of the embodiment of FIG. 8 with the coating of FIG. 12 and showing the vacuum-water interface.

DETAILED DESCRIPTION OF THE ILLUSTRATED EMBODIMENTS

Figure 9:
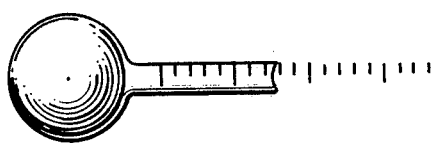

FIGS. 1-7 show a preferred embodiment of the time-depth integrator of the invention comprising body halves 21 and 22 sealingly joined to one another as shown in FIG. 3.

Body half 22, FIGS. 3, 4, and 5, is provided with channel 23 which communicates with cavity 24. Channel 23 may be v-shaped, as shown, or may be any other convenient shape. Top body half 21 has a port 25 communicating from its upper surface to its lower surface. A sealed port extension 26 is adapted to extend above the upper surface of the top body half 21. Port extension 26 is adapted to be easily broken off so that port 25 is opened. Port 25 is of a diameter so that it acts as an orifice to restrict flow therethrough to a preselected rate.

Top body half 21 is sealingly secured to bottom body half 22 in any suitable manner so that port 25 communicates with channel 23 at its distal end 23b. The cavity, channel, and port are all evacuated of air when the device is assembled. Graduations 27 may be provided on the upper surface of top piece 21 as illustrated so as to quantitate channel 23 along most of its length. Alternatively, graduations could be provided on the bottom body half 22 adjacent to or under channel 23, or could be provided on the lower surface of the top piece 21.

The entire assembly 20 may be conveniently placed into a socket on a wrist strap (not shown) during use or in any other type of convenient carrying case, or could have a strap or a length of cord attached thereto to be held or tied to the user.

In use, a diver enters the water with the time-depth integrator and breaks the seal 26. Water will begin to flow through the port 25 into the channel 23 at a rate dependent upon the size of port 25. As a diver descends into deeper water, the water pressure increases thus causing the rate of flow through the orifice 26 to increase. As a result, the channel 23 will fill faster when a diver is in deep water than it will when he is in shallow water.

The United States Navy has established maximum safe limits for diving at various depths without requiring decompression procedures. For instance, it was determined that a diver can ascend immediately to the surface without danger of nitrogen bubble formation in his body if he remains no longer than 100 minutes at a depth of 50 feet, or 25 minutes at 100 feet, or 5 minutes at 150 feet. Even though there is not a linear relationship between a given depth and the safe maximum limit for diving at that depth, it has been found that an orifice 26 which allows the channel 23 to fill in about 100 minutes at a depth of 50 feet will also allow the channel to fill in about 25 minutes at 100 feet, and in about 5 minutes at 150 feet. Thus, the device is an accurate indicator of the maximum safe diving time at any given depth.

Naturally, a diver who wishes to descend to a depth of 150 feet cannot do so instantly. Rather, he will spend some time at lesser depths during his descent. The time-depth integrator will begin filling with water as soon as the seal 26 is broken. As the diver descends, the fill rate increases so that when he reaches 150 feet, some water will have already entered the channel 23. Thus, as a diver moves between different depths, the fill rate will increase or decrease depending on whether he is descending or ascending. Since the rate of nitrogen absorption by his body is likewise dependent on the water pressure, the device is an accurate gauge of the diver's approach to the maximum safe limits even where he is diving at varying depths during one dive.

Figure 6:
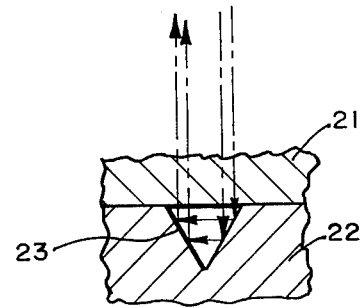
Figure 7:
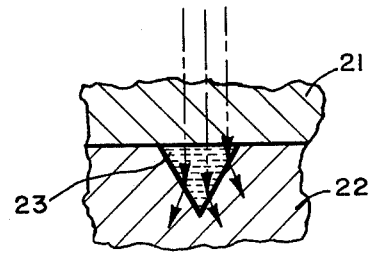

At least the top body half of the device is preferably constructed of transparent material so that light may enter channel 23 from above as shown in FIGS. 6 and 7 and so that channel 23 may easily be observed by the user of the device. With the cross section of channel 23 shaped as illustrated in FIGS. 6 and 7, the area of channel 23 that is evacuated will reflect light back through the top piece 21 as shown in FIG. 6. The area of channel 23 which is filled with water will not reflect light, but will allow it to pass through as shown in FIG. 7. This feature allows the interface between water and vacuum to be easily observed so that a diver can readily ascertain how much of the channel 23 has filled with water. The graduations will indicate what proportion of the tube remains to be filled. If water has progressed almost to the end of the graduations, the diver knows he must surface. If the water has progressed beyond the end of the graduations, the diver knows he will have to go through decompression procedures before surfacing.

An alternate embodiment of the invention is shown in FIG. 8. This embodiment is comprised of a bulb 30, a tube 31 which communicates with the interior of the bulb 30, an orifice 32 which restricts the flow of water into the tube 31, and a seal 31a on the end of the tube 31. The seal 31a may be broken by snapping off the end of the tube where it has been scored as at 33. Again, the device is evacuated and may be provided with graduations 34. In use, a diver enters the water with the device and breaks the seal 31a. The tube 31 fills at a rate dependent upon the size of the orifice, the diver's depth, and the amount to which the device has been evacuated. When water has progressed a predetermined distance in tube 31, the diver must either ascend, or if he continues diving, he must observe decompression procedures in order to avoid nitrogen bubble formation in his body when he does surface.

If the time-depth integrator is constructed of a material with a refractive index equal to that of water, the material will appear invisible in water, and only the vacuum will be visible. The embodiment of FIG. 8 will appear as shown in FIG. 9 during use under these conditions.

Figure 10:
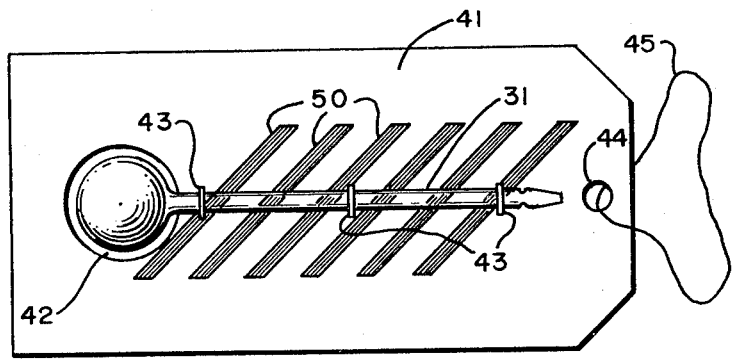

The device shown in FIG. 8 may optionally be attached to a holder such as shown in FIG. 10. There, a waterproof card 41 has a portion 42 cut out in which the bulb 30 rests. Staples 43 may be provided to hold the tube 31 securely in place. A hole 44 may be provided through which a cord 45 may pass in order to hang the device around the diver's neck or to tie it to some portion of his body.

Figure 11:
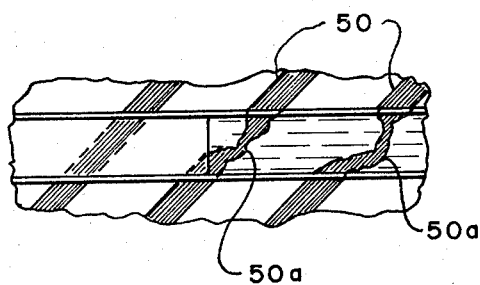

A series of closely spaced parallel bands 50 running at an oblique angle with respect to the tube 31 may be added to the card 41 as shown in FIGS. 10 and 11. The bands 50 will appear distorted, as at 50a, in the portion of tube 31 that has filled with water.

Figure 12:
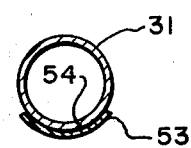
Figure 13:
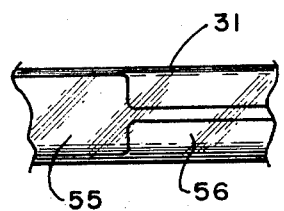

Another manner of making the vacuum-water interface readily visible is shown in FIGS. 12 and 13. There, a colored material 53 is applied to the bottom surface 54 of tube 31. Looking from above, as in FIG. 13, the band will appear to cover the entire bottom of the tube 31 in areas of vacuum 55. The band will appear narrowed in areas of the tube 31 containing water 56. This is similar to an ordinary thermometer.

Various other means for observing the vacuum-water interface could be employed, and the means described may be adapted for use with either embodiment. The straight tube 31 shown in FIG. 8 may optionally be bent into some other shape.

The length of the tube and the length of the portion thereof that will fill with water during the allowable length of dive without decompression will vary and is a function of the amount to which the device is evacuated, and the size of the orifice used, and the cross-sectional size of the tube opening. The cross-sectional size of the channel that fills with water is limited to sizes in which the surface tension of the water in the passage is such that the water will completely fill the passage and not merely run along a portion thereof.

An accurate orifice may be provided in the device by drilling out the port or by use of a short length of tubing, such as that used for hypodermic needles, wherein the inside diameter is known and very accurately controlled. For a device as shown in FIGS. 1-7, an inside diameter of 0.0004 inches has been found satisfactory for the orifice or passage 25 which forms the orifice. With such an orifice the channel 23 may be triangular as shown with a depth of 0.094 inches and be arranged in an arc with a diameter of 1.625 inches from center to opposite center of channel 23.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A time-depth integrator for indicating when a diver is approaching or has reached the maximum safe limit for diving without requiring decompression procedures when surfacing comprising:
   (a) An evacuated chamber;
   (b) An elongate channel communicating at one end with the evacuated chamber and sealed at its other end, such seal adapted to be broken;
   (c) An orifice located in the end of the channel away from the chamber for restricting flow of fluid into the channel after the seal on such channel has been broken; and
   (d) An indicator along said channel to show when the maximum safe limit has been reached and the approach thereto.

2. A time-depth integrator according to claim 1 wherein the channel is a transparent tube extending from and communicating with the evacuated chamber.

3. A time-depth integrator according to claim 1, wherein the evacuated chamber and the communicating channel are formed by sealingly joining two body halves together.

4. A time-depth integrator according to claim 1 wherein graduations along the channel indicate the point at which the maximum safe limit has been reached and the approach thereto.

5. A time-depth integrator according to claim 1, wherein the channel is formed in material having a refractive index substantially the same as that of water so that the material is not visible under water but only the evacuated portion of the channel is visible.

6. A time-depth integrator according to claim 1, wherein the cross-sectioned shape of the channel is adapted to reflect light when said indicator means is void of water, but passes light in areas of said channel containing water, thus affording a clearly visible interface between the vacuum and the entering water.

7. A time-depth integrator according to claim 1, wherein a broad band of color is applied to the bottom of the channel that will appear broad when no water is in said channel, but will appear narrow in areas of said channel containing water, thus affording a clearly visible interface between the vacuum and the entering water.

8. A time-depth integrator according to claim 1, wherein a number of parallel, closely spaced colored bands pass under the channel at an oblique angle such that the bands appear undistorted when no water is in said indicator means, but which appear distorted in areas of said indicator means containing water, thus affording a clearly visible interface between the vacuum and the entering water.

* * * * *